US011448266B2

(12) United States Patent
Schaefer et al.

(10) Patent No.: US 11,448,266 B2
(45) Date of Patent: Sep. 20, 2022

(54) DISK FOR A DISK CLUTCH OR BRAKE, DISK CLUTCH OR BRAKE WITH SUCH A DISK, AND A METHOD FOR PRODUCING SUCH A DISK

(71) Applicant: BorgWarner Inc., Auburn Hills, MI (US)

(72) Inventors: Michael Wilhelm Schaefer, Ketsch (DE); Marko Marchlewski, Weyhausen (DE)

(73) Assignee: BorgWarner Inc., Auburn Hills, MI (US)

( * ) Notice: Subject to any disclaimer, the term of this patent is extended or adjusted under 35 U.S.C. 154(b) by 298 days.

(21) Appl. No.: 16/676,521

(22) Filed: Nov. 7, 2019

(65) Prior Publication Data

US 2020/0149595 A1    May 14, 2020

(30) Foreign Application Priority Data

Nov. 8, 2018   (DE) .......................... 102018008782.5

(51) Int. Cl.
*F16D 13/72*    (2006.01)
*F16D 13/64*    (2006.01)
(Continued)

(52) U.S. Cl.
CPC .......... *F16D 13/648* (2013.01); *F16D 13/52* (2013.01); *F16D 13/72* (2013.01); *F16D 13/74* (2013.01);
(Continued)

(58) Field of Classification Search
CPC ......... F16D 65/123–128; F16D 13/648; F16D 13/72
(Continued)

(56) References Cited

U.S. PATENT DOCUMENTS

| 7,650,977 B2 * | 1/2010 | Suzuki | F16D 13/648 |
| | | | 192/113.36 |
| 2007/0000747 A1 * | 1/2007 | Miyazaki | F16D 25/123 |
| | | | 192/70.12 |

(Continued)

FOREIGN PATENT DOCUMENTS

| AT | 516124 A1 | 2/2016 |
| DE | 102018001877 A1 | 11/2018 |
| EP | 2733374 B1 | 7/2018 |

OTHER PUBLICATIONS

English language abstract and machine-assisted English translation for AT 516 124 extracted from espacenet.com database on Nov. 27, 2019, 11 pages.

(Continued)

*Primary Examiner* — Christopher P Schwartz
(74) *Attorney, Agent, or Firm* — Howard & Howard Attorneys PLLC (57) ABSTRACT

The present invention relates to a disk (2) for a disk clutch or brake (4) comprising a first friction surface (28) and a second friction surface (34) facing away from the first friction surface (28), in which recesses and/or grooves (40, 42, 44) are provided. A first type of recesses and/or grooves (40), which is generated by a material shaping and/or a material casting and/or a non-material removing first manufacturing method, is provided in the first friction surface (28), and a second type of recesses and/or grooves (42), which is generated by a material removing second manufacturing method, is provided in the second friction surface (34). In addition, the present invention relates to a disk clutch and brake (4) comprising such a disk (2) and a method for producing such a disk (2).

17 Claims, 3 Drawing Sheets

(51) Int. Cl.
*F16D 65/12* (2006.01)
*F16D 13/74* (2006.01)
*F16D 55/40* (2006.01)
*F16D 13/52* (2006.01)
*F16D 65/18* (2006.01)
*F16D 121/04* (2012.01)
*F16D 65/02* (2006.01)

(52) U.S. Cl.
CPC ............ *F16D 55/40* (2013.01); *F16D 65/123* (2013.01); *F16D 65/127* (2013.01); *F16D 65/128* (2013.01); *F16D 65/186* (2013.01); *F16D 2065/132* (2013.01); *F16D 2065/1332* (2013.01); *F16D 2121/04* (2013.01); *F16D 2200/0034* (2013.01); *F16D 2250/0007* (2013.01); *F16D 2250/0023* (2013.01); *F16D 2250/0038* (2013.01); *F16D 2250/0069* (2013.01)

(58) Field of Classification Search
USPC ............... 188/18 A, 218 XL, 250 B, 251 M; 192/70.12, 113.36
See application file for complete search history.

(56) References Cited

U.S. PATENT DOCUMENTS

| | | | |
|---|---|---|---|
| 2008/0006504 A1* | 1/2008 | Sudau | F16D 13/648 192/113.36 |
| 2014/0131160 A1* | 5/2014 | Tsuda | F16D 13/74 192/66.3 |
| 2014/0182995 A1* | 7/2014 | Ando | F16D 69/00 192/107 R |
| 2014/0290845 A1* | 10/2014 | Collis | B23P 23/04 156/249 |
| 2015/0354649 A1* | 12/2015 | Forssberg | F16D 13/74 188/218 XL |
| 2016/0298698 A1* | 10/2016 | Merkel | F16D 13/648 |
| 2018/0340577 A1* | 11/2018 | Suzuki | F16D 13/74 |
| 2020/0025263 A1* | 1/2020 | Stope | F16D 69/0408 |

OTHER PUBLICATIONS

Machine-assisted English language abstract and machine-assisted English translation for DE 10 2018 001 877 extracted from espacenet.com database on Nov. 27, 2019, 15 pages.

\* cited by examiner

Fig. 2

Fig. 3

DISK FOR A DISK CLUTCH OR BRAKE, DISK CLUTCH OR BRAKE WITH SUCH A DISK, AND A METHOD FOR PRODUCING SUCH A DISK

CROSS-REFERENCE TO RELATED APPLICATIONS

This application claims the benefit of German Patent Application No. 102018008782.5, filed Nov. 8, 2018, the disclosure of which is herein incorporated by reference in its entirety.

DESCRIPTION

The present invention relates to a disk for a disk clutch or brake comprising a first friction surface and a second friction surface facing away from the first friction surface, in which surfaces recesses and/or grooves are provided. In addition, the present invention relates to a disk clutch or brake comprising such a disk and to a method for producing such a disk.

Disk clutches and brakes, in particular, wet-running disk clutches or brakes, are known from practice. The known disk clutches have a first disk set which is connected rotationally fixed to a first disk carrier, and a second disk set which is connected rotationally fixed to a second disk carrier. The disks of the two disk sets are generally arranged alternating one behind the other, so that they may be brought into frictional engagement with one another via their friction surfaces facing one another. In wet-running disk clutches, a so-called drag torque occurs when the clutch is open, which is traced back to a fluid, for example, coolant or lubricant, flowing between the friction surfaces, and which should be as low as possible. In addition, the friction coefficient acting when the clutch is closed is decisive for the frictional and operating behavior of the disk clutch. In order to influence both, in particular in order to reduce the drag torque, the disks of the first or second disk set are designed in such a way that these have a first friction surface and a second friction surface facing away from the first friction surface, wherein recesses and/or grooves are provided in the first and second friction surfaces. One thereby attempts to influence or to optimally adjust, in particular, the drag torque and the coefficient of friction using a specific dimensioning and shape of the recesses and/or grooves. The durability of the individual disks should also be increased by the corresponding dimensioning and shaping of the recesses and/or grooves within the friction surfaces. However, it has been demonstrated that the listed features are only influenced to a limited extent solely by the dimensioning and/or shaping of the recesses and/or grooves within the first and second friction surfaces.

It is therefore one object of the present invention to create a disk for a disk clutch or brake which, regardless of the respective shape or dimensioning of the recesses and/or grooves within the first and second friction surfaces, improves the coefficients of friction and the drag torque, wherein, a simplified production of the disks should be additionally possible. Furthermore, the underlying object of the present invention is to create a disk clutch or brake comprising this type of advantageous disk. In addition, one object of the present invention comprises specifying an advantageous method for producing such a disk.

This problem is solved by the features listed in patent claim 1, 6, or 8. Advantageous embodiments of the invention are the subject matter of the subclaims.

The disk according to the invention may be used, for example, in a disk clutch or brake. Thus, the disk may, for example, by an outer disk with a corresponding outer toothing or an inner disk with a corresponding inner toothing. The disk is preferably designed as substantially annular disk shaped. Thus, the disk has a first friction surface, which is preferably designed as annular, and a second friction surface facing away from the first friction surface, which is likewise preferably designed as annular. The first and second friction surface preferably have opposite axial directions with respect to the longitudinal axis or axis of rotation of the respective disk. Recesses and/or grooves, which, for example, may function for coolant and/or lubrication supply, may be provided in the first friction surface and the second friction surface, when the disk is used in a so-called wet-running disk clutch or brake. A first type of recesses and/or grooves is provided in the first friction surface of the disk, wherein the first type of recesses and/or grooves is generated by a material shaping and/or a material casting and/or a non-material removing first manufacturing method. In contrast, a second type of recesses and/or grooves, which is generated by a material-removing second manufacturing method, is provided in the second friction surface facing away from the first friction surface. It has been shown that for two disk sets, identical with respect to shape and dimensioning, significantly different drag torques and coefficients of friction, and also different durabilities, may be achieved if the two types of recesses and/or grooves are provided in the disk. Thus, the drag torque within a disk clutch or brake comprising such a disk may be reduced due to the first type of recesses and/or grooves in the first friction surface. It has also been shown that the first type of recesses and/or grooves in the first friction surface has a positive effect on the durability of the disk, and consequently on the durability of the disk clutch or brake. In contrast, the second type of recesses and/or grooves in the second friction surface leads to a higher coefficient of friction so that the friction behavior of the disk is improved within the disk clutch or brake. Consequently, a disk is created, which, in a closed disk clutch or brake, is able to cause an increase in the coefficient of friction on the one hand and on the other hand is able to cause a reduction of the drag torque. If the first type of recesses and/or grooves is provided in the first friction surface, while the second type of recesses and/or grooves is provided in the second friction surface facing away from the first friction surface, then the manufacturing of the disk is additionally simplified with respect to a disk in which both the first type and also the second type of recesses and/or grooves are present in the first and/or second friction surface. Thus, it is possible, for example, to apply the first manufacturing method to the first friction surface and the second manufacturing method to the second friction surface simultaneously or in a chronologically overlapping way, in order to be able to conclude the production of the recesses and/or grooves particularly quickly, while the machining of the first and/or second friction surface, in the case of disks with both types of recesses and/or grooves in the first and/or second friction surface, inevitably necessitates sequential manufacturing steps, which contribute to a higher time length of the manufacturing.

As previously mentioned, the first type of recesses and/or grooves is created by material shaping and/or material casting so that no material is removed. Thus, the material shaping or material casting might be carried out, for example, in the way in that a corresponding friction lining is already correspondingly shaped or cast on the respective disk. In one preferred embodiment of the disk according to the invention, the first type of recesses and/or grooves is generated by stamping, particularly as this enables a fast and simple manufacturing of the first type of recesses and/or grooves, wherein the corresponding recesses and/or grooves may be additionally manufactured particularly exactly and without major post-processing. In the case of one of the friction linings forming the friction surface, the stamping may additionally be carried out simultaneously or in a chronologically overlapping way with the application of the friction lining on the disk.

As already previously explained, the second type of recesses and/or grooves is generated by a material-removing second manufacturing method. Manufacturing methods may also be included in which the material is removed in chemical ways. However, in order to provide particularly exactly shaped and dimensioned recesses and/or grooves of the second type, which implement the desired operating behavior in a targeted way, the second type of recesses and/or grooves is generated by a mechanical manufacturing method in another preferred embodiment of the disk according to the invention. Thus, the second type of recesses and/or grooves may be generated, for example, by grinding, wherein it is particularly preferred in this embodiment if the second type of recesses and/or grooves is generated by milling.

In one advantageous embodiment of the disk according to the invention, the first type of recesses and/or grooves in the first friction surface has a shallower depth than the second type of recesses and/or grooves in the second friction surface. It has been demonstrated that by this means the durability of the disk may be increased, particularly as the first type of recesses and/or grooves in the first friction surface generated by material shaping may lead to an earlier component failure than is the case in the second type of recesses and/or grooves in the second friction surface, with a corresponding depth, which had been generated by a material-removing second manufacturing method. This occurs, in particular, if the corresponding friction surface is formed by a friction lining which, due to the substantial material shaping, tends to detach from the disk or from a friction lining carrier of the disk.

In another advantageous embodiment of the disk according to the invention, the first and/or second friction surface is/are formed by a friction lining fixed on a friction lining carrier. The friction lining is preferably a paper friction lining. In this context, it has additionally proven advantageous if the friction lining is glued to the friction lining carrier. In particular, the paper friction lining may be processed relatively easily by both the first manufacturing method and also by the second manufacturing method, in order to create the first type of recesses and/or grooves in the first friction surface and the second type of recesses and/or grooves in the second friction surface so that the production of the disk is significantly simplified.

In one particularly advantageous embodiment of the disk according to the invention, the friction lining is fastened on the friction lining carrier in a segmented way or glued on the friction lining carrier. This enables a material-saving application of the friction lining, in particular of the paper friction lining on the one hand. On the other hand, this enables the generation of a third type of recesses and/or grooves interspersed between the corresponding friction lining segments, so that this third type of recesses and/or grooves does not need to be generated by the listed first or second manufacturing methods. The segmented friction lining with the interspersed third type of recesses and/or grooves also enables that relatively simple grooves may be achieved with a maximum groove depth, particularly as the third type of recesses and/or grooves may be formed by the friction lining carrier itself. It is also preferred in this embodiment if the recesses and/or grooves of the third type extend from an inner edge to an outer edge of the first and/or second friction surface.

In order to simplify the production of the disk in the previously described way, the first friction surface has no recesses and/or grooves of the second type, and/or the second friction surface has no recesses and/or grooves of the first type. It is thereby preferred if only the first type of recesses and/or grooves is provided in the first friction surface and/or only the second type of recesses and/or grooves is provided in the second friction surface. It is preferred in one modified embodiment if, in the first friction surface, the previously mentioned third type of recesses and/or grooves is provided and moreover only the first type of recesses and/or grooves is provided, while alternatively or supplementally, the previously mentioned third type of recesses and/or grooves and moreover only the second type of recesses and/or grooves are provided in the second friction surface. Regardless of the respective embodiment variant, in this way the first manufacturing method is assigned to the first friction surface and the second manufacturing method is assigned to the second friction surface, by which means they may be processed simultaneously or chronologically overlapping. In addition, the first type of recesses and/or grooves is not influenced by the second manufacturing method, while the second type of recesses and/or grooves is not influenced by the first manufacturing method. In other words, the recesses and/or grooves are produced or producible in the two friction surfaces particularly exactly and without being influenced.

The disk clutch or brake according to the invention is preferably designed as a wet-running disk clutch or brake, particularly preferably as a hydraulically actuatable disk clutch or brake. The disk clutch or brake has a first disk set, for example, a set made from outer disks or inner disks, which is connected rotationally fixed to a first disk carrier, for example, an outer or inner disk carrier. In addition, the disk clutch or brake has a second disk set, for example a set made from inner or outer disks, which is connected rotationally fixed to a second disk carrier, for example, an inner or outer disk carrier. The disks are preferably arranged displaceably on the respective disk carrier, wherein the disks particularly preferably follow one another alternatingly in the axial direction. In each case, the disks are arranged in such a way that the disks of the two disk sets may be brought into frictional engagement with one another via their friction surfaces. The first and/or second disk set has at least one disk of the type according to the invention in order to achieve the advantages, previously described with reference to the disk according to the invention, for such a disk clutch or brake.

In one preferred embodiment of the disk clutch or brake according to the invention, the disks of the first disk set are designed as disks of the previously described type according to the invention, while the disks of the second disk set have friction surfaces that are not provided with recesses and/or grooves. Thus, the disks of the disk set may be designed, for example as disks without friction linings or as steel disks.

According to another preferred embodiment of the disk clutch or brake according to the invention, the first friction surfaces of the disks of the first disk set face in a first axial direction of the disk clutch, while the second friction surfaces of the disks of the first disk set face in a second axial direction of the disk clutch opposite the first axial direction. In this way, a particularly uniform frictional and wear behavior may be achieved.

The method according to the invention functions for manufacturing a disk, in particular a disk of the previously described type according to the invention, and has the method steps subsequently described in greater detail. Thus, a disk is initially provided with a first friction surface and a second friction surface facing away from the first friction surface, wherein the disk is preferably designed as substantially annular disk shaped and/or has an inner or outer toothing. Subsequently, a first type of recesses and/or grooves is generated in the first friction surface by a material shaping and/or material casting and/or non-material removing first manufacturing method, wherein the first manufacturing method is preferably stamping. In addition, a second type of recesses and/or grooves is generated in the second friction surface by a material-removing second manufacturing method, preferably by a mechanical manufacturing method, particularly preferably by milling.

With respect to the advantages and other embodiment variants of the method according to the invention for producing a disk, reference is made to the previous description of the disk according to the invention, from which additional embodiment variants of the method for producing the disk arise clearly for a person skilled in the art.

In one preferred embodiment of the method according to the invention for producing a disk, the provision of the disk comprises the provision of a friction lining carrier and the fixing of a friction lining, optionally a paper friction lining, on the friction lining carrier to form the first friction surface and/or the fixing of a friction lining, optionally a paper friction lining, on the friction lining carrier to form the second friction surface. The fixing of the respective friction lining is thereby preferably carried out by gluing.

In one particularly preferred embodiment of the method according to the invention for producing a disk, the fixing of the friction lining to form the first friction surface is carried out simultaneously or chronologically overlapping with the generation of the first type of recesses and/or grooves in the first friction surface. Thus, the friction lining may be pressed against the friction lining carrier, for example, with the interposition of an adhesive, by means of a stamp or the like, while the stamp or the like has a predefined contour or pressure surface, which is impressed in the friction surface on the friction lining. Consequently, two method steps are combined here for producing the disk, in order to simplify the manufacturing.

According to another advantageous embodiment of the method according to the invention, the fixing of the friction lining on the friction lining carrier to form the first and/or second friction surface comprises the fixing of a segmented friction lining to generate an interspersed third type of recesses and/or grooves between the corresponding friction lining segments, so that this third type of recesses and/or grooves may be created in a particularly easy and material-saving way in the first and/or second friction surface in addition to the first and/or second type of recesses and/or grooves.

In one particularly preferred embodiment of the method according to the invention, the first type of recesses and/or grooves is generated in the first friction surface simultaneously or chronologically overlapping with the second type of recesses and/or grooves in the second friction surface. Thus, the disk may be analogously processed—when correspondingly clamped—on both sides using the first or second manufacturing method, by which means a particularly fast processing and manufacturing is ensured.

In another advantageous embodiment of the method according to the invention, the first type of recesses and/or grooves in the first friction surface is generated with a shallower depth than the second type of recesses and/or grooves in the second friction surface. This has—as already previously explained—a positive effect on the durability of the disk.

In another preferred embodiment of the method according to the invention, no recesses and/or grooves of the second type are generated in the first friction surface and/or no recesses and/or grooves of the first type are generated in the second friction surface. In this embodiment, it is additionally preferred if, only the first type of recesses and/or grooves, preferably together with the third type of recesses and/or grooves, is generated in the first friction surface, and/or only the second type of recesses and/or grooves, preferably together with the third type of recesses and/or grooves, is generated in the second friction surface, in order to simplify the manufacturing.

The invention will be subsequently described in greater detail with the aid of an exemplary embodiment with reference to the appended drawings. As shown in.

Figure 1:
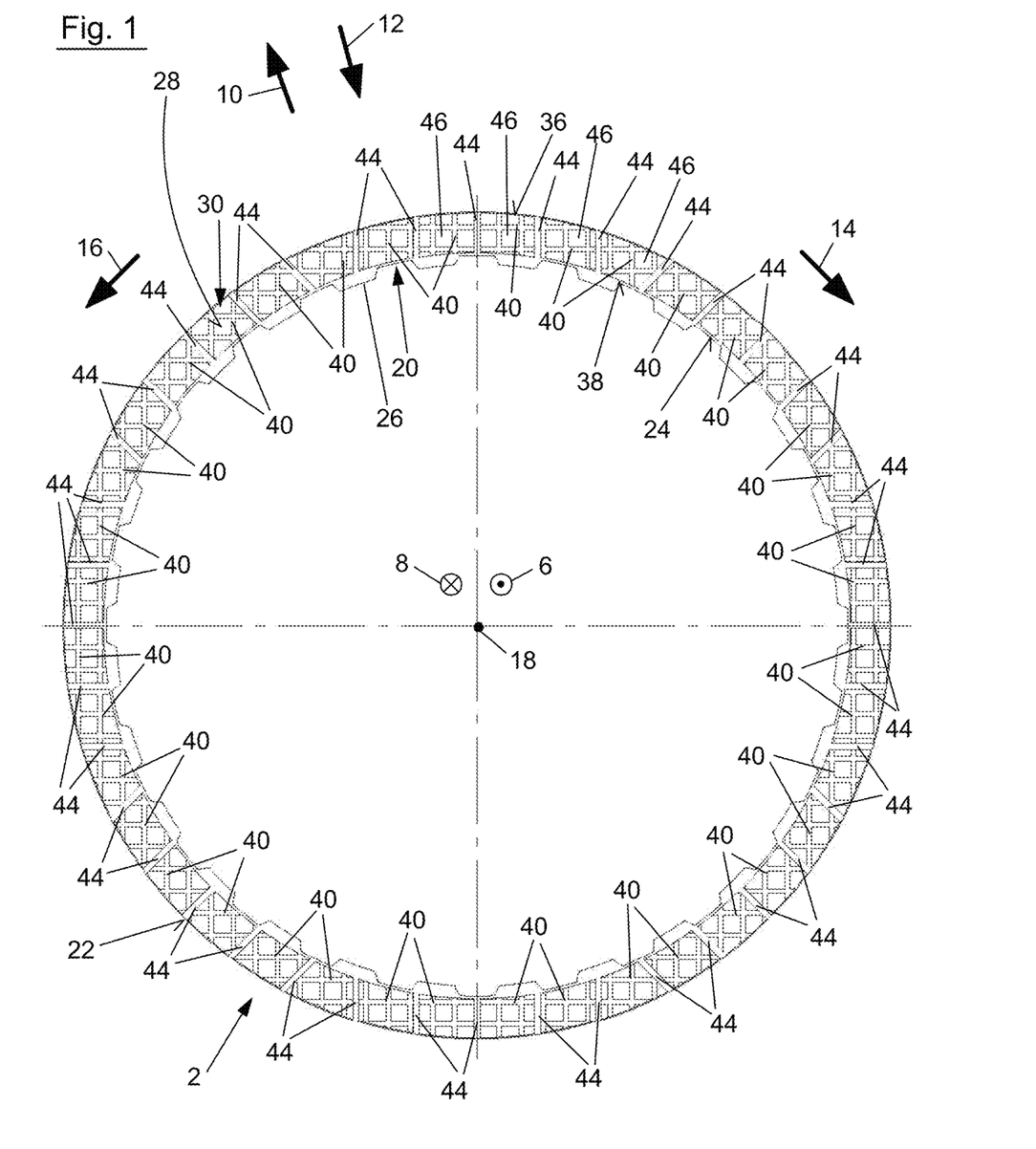
FIG. 1 a front view of one embodiment of a disk.
Figure 2:
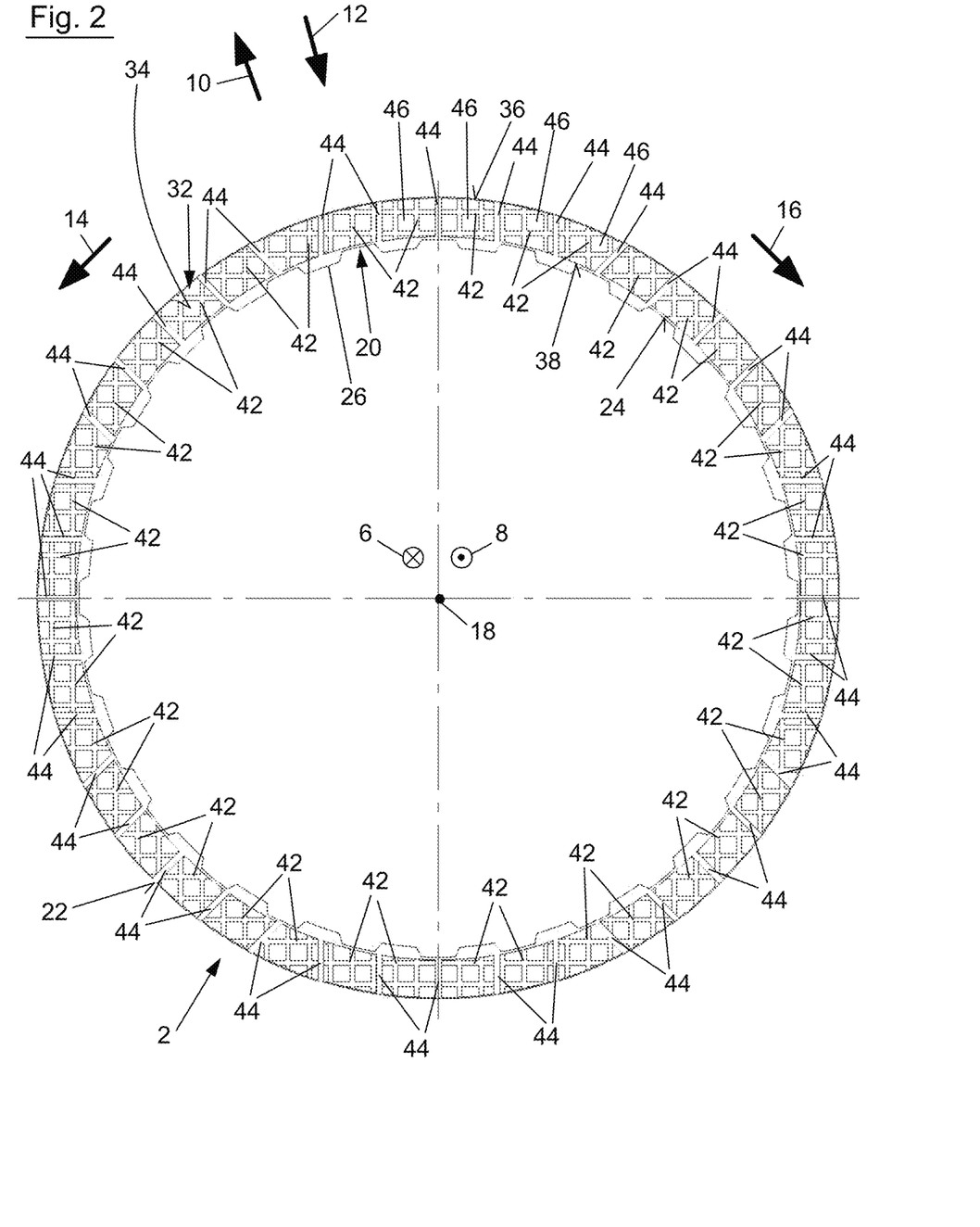
FIG. 2 a rear view of the disk from FIG. 1.

FIGS. 1 and 2 show a disk 2 in a front or rear view for a disk clutch 4, to be described later with reference to FIG. 3. Even if a disk clutch 4 is consistently discussed herein, the subsequent embodiments also apply in a corresponding way to a disk brake.

In the figures, opposite axial directions 6, 8, opposite radial directions 10, 12, and opposite circumferential directions 14, 16 of disk 2 or of disk clutch 4 are indicated by means of corresponding arrows, wherein disk 2 or disk clutch 4 has an axis of rotation 18 extending in axial directions 6, 8, about which disk 2 or disk clutch 4 is rotatable, so that circumferential directions 14, 16 may also be designated as directions of rotation.

Disk 2 is designed as a friction lining disk, stated more precisely as a disk 2 provided with a friction lining on both sides. Thus, disk 2 has a friction lining carrier 20, designed as an annular disk shape, which may be designed as a steel or sheet metal part. Friction lining carrier 20 has an outer edge 22 facing outward in radial direction 10 and an inner edge 24 facing inward in radial direction 12. A rotary driving contour 26 is provided on inner edge 24, in this case in the shape of an inner toothing. Consequently, depicted disk 2 is an inner disk. Alternatively, however, rotary driving contour 26 might also be provided on outer edge 22 or friction lining carrier 20, so that it might be an outer disk.

On the side facing the viewer of FIG. 1 and in axial direction 6, disk 2 has a first friction surface 28, which is formed from a friction lining 30 fixed on the side of friction lining carrier 20 facing in axial direction 6. A friction lining 32 is likewise fixed on the side of friction lining carrier 20 facing in axial direction 8, which functions to form a second friction surface 34 of disk 2 facing away from first friction surface 28 and in axial direction 8, as this is gathered from FIG. 2. The two friction linings 30, 32 are paper friction linings, which are additionally glued to friction lining carrier 20. Two friction surfaces 28, 34 are additionally delimited outwardly in radial direction 10 by an outer edge 36 and inwardly in radial direction 12 by an inner edge 38, which are designed as extending circumferentially substantially in circumferential direction 14, 16. Outer edge 36 thereby substantially corresponds with outer edge 22 of friction lining carrier 20 or is at most set back marginally inwardly in radial direction 12 with respect to outer edge 22. In contrast, inner edge 38 is set back outwardly in radial direction with respect to inner edge 24 of friction lining carrier 20, in this case, preferably set back farther than is the case for outer edge 36 with respect to outer edge 22.

A first type of recesses and/or grooves 40 is provided in first friction surface 28. First type of recesses and/or grooves 40, which preferably form a groove pattern in a grid or honeycomb shape, was generated by a material shaping first manufacturing method, and thus not by a material removing manufacturing method. It is hereby preferred if first type of recesses and/or grooves 40 is generated by stamping. Thus, first type of recesses and/or grooves 40 may, for example, be generated simultaneously with the gluing of friction lining 30 to friction lining carrier 20; however, first type of recesses and/or grooves 40 might also have been stamped after friction lining 30 was fixed on friction lining carrier 20. Alternatively, the first manufacturing method may also be a material casting first manufacturing method, in which the provided friction lining 30 had already been provided with first type of recesses and/or grooves 40 during production of the same.

In contrast, a second type of recesses and/or grooves 42 is provided in second friction surface 34. Second type of recesses and/or grooves 42 again form a groove pattern, which is formed as grid or honeycomb shaped and corresponds in its dimensioning substantially to the groove pattern of first type of recesses and/or grooves 40, as this may be gathered from FIG. 2. Second type of recesses and/or grooves 42 is, in contrast to first type of recesses and/or grooves 40, generated by a material-removing second manufacturing method. This may basically be any material-removing manufacturing method; however, it is preferred if this is a mechanical manufacturing method, like grinding. It is thereby particularly preferred if second type of recesses and/or grooves 42 is generated by milling. Even if it is not obvious from FIGS. 1 and 2, first type of recesses and/or grooves 40 has a shallower depth, thus a smaller extension in axial directions 6, 8, than second type of recesses and/or grooves 42.

As already previously explained, friction linings 30, 32 were fixed on friction lining carrier 20, wherein friction linings 30, 32 were fixed on friction lining carrier 20 in a segmented way. This is carried out by generating an interspersed third type of recesses and/or grooves 44, which are formed between friction lining segments 46 of respective friction lining 30 or 32 and extend substantially from inner edge 38 outward in radial direction 10 to an outer edge 36, wherein third type of recesses and/or grooves 44 is not only formed as continuous, but also has a groove bottom which is formed by friction lining carrier 20.

With respect to the structure of disk 2, it is thus initially maintained that first friction surface 28 has no recesses and/or grooves 42 of the second type, while second friction surface 34 has no recesses and/or grooves 40 of the first type. Instead, only recesses and/or grooves 40 of the first type, with the exception of recesses and/or grooves 44 of the third type, are provided in first friction surface 28, while only recesses and/or grooves 42 of the second type, with the exception of recesses and/or grooves 44 of the third type, are provided in second friction surface 34.

Figure 3:
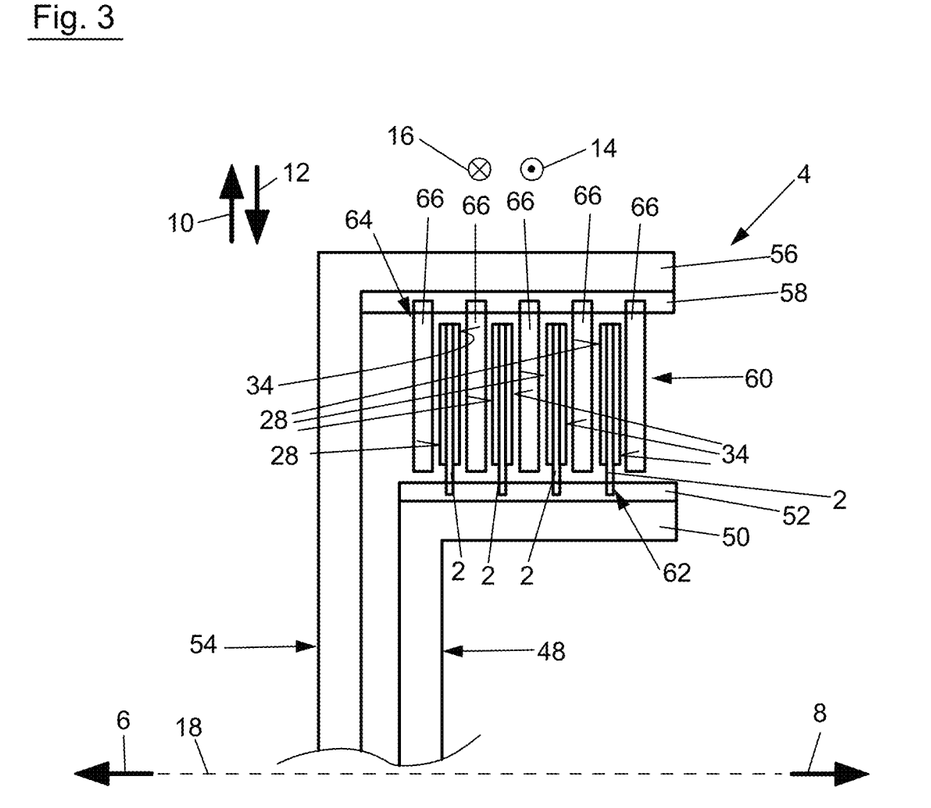
FIG. 3 a partial side view of a disk clutch with at least one disk according to FIGS. 1 and 2 in a sectional depiction.

FIG. 3 shows disk clutch 4. Disk clutch 4 is designed as a wet-running disk clutch 4 and may be hydraulically actuated, even if a corresponding actuating piston or actuating element is omitted in the depiction in FIG. 3. Disk clutch 4 has a first disk carrier 48, which is designed here as an inner disk carrier. First disk carrier 48 has a first disk carrier section 50 extending substantially in axial directions 6, 8, which is provided with a first rotary driving contour 52 facing outward in radial direction 10 and extending in circumferential direction 14, 16. A second disk carrier 54, which is additionally assigned to first disk carrier 48, is designed in this case as an outer disk carrier, and has a second disk carrier section 56, which likewise extends substantially in axial directions 6, 8, and is arranged nested with first disk carrier section 50 in radial direction 10, 12. Second disk carrier section 56 has a second rotary driving contour 58 facing inward in radial direction 12 and extending in circumferential direction 14, 16. The two rotary driving contours 52, 58 are preferably designed as toothings.

A disk set 60 is arranged in radial direction 10, 12 between two disk support sections 50, 56. Disk set 60 has a first disk set 62, wherein the disks of first disk set 62 are formed from disks 2 described with reference to FIGS. 1 and 2. Thus, rotary driving contours 26 of disks 2 of first disk set 62 are in rotary driving engagement with first rotary driving contour 52 of disk support section 50 of first disk carrier 48; however, are displaceable in axial direction 6, 8 relative to first disk carrier 48. In addition, disk set 60 has a second disk set 64, whose disks 66 are designed as outer disks and are in rotary driving engagement with second rotary driving contour 58 of second disk carrier 54, wherein disks 66 are displaceable in axial direction 6, 8 relative to second disk carrier 54. Disks 2 of first disk set 62 and disks 66 of second disk set 64 are arranged in such a way that these follow one another alternatingly in axial direction 6, 8, wherein disks 66 of second disk set 64 are designed as disks or steel disks without a friction lining. Consequently, disks 2 of first disk set 62 and disks 66 of second disk set 64 may be brought into frictional engagement with each other via friction surfaces facing each other through the compression of disk set 60. While disks 2 of first disk set 62 have recesses and/or grooves 40, 42, 44, previously described in greater detail, in first and second friction surfaces 28, 34, no recesses and/or grooves are provided in the corresponding friction surfaces in disks 66 of second disk set 64. First friction surfaces 28 of disks 2 of first disk set 62 also face in axial direction 6 of disk clutch 4, while their second friction surfaces 34 face in axial direction 8, opposite to axial direction 6, of disk clutch 4.

In the context of producing disks 2 according to FIGS. 1 through 3, the procedure is as follows. A disk 2 is initially provided with a first friction surface 28 and a second friction surface 34, which faces away from first friction surface 28. In the depicted embodiment, the provision of disk 2 comprises the provision of friction lining carrier 20 and the fixing of friction linings 30, 32, optionally of paper friction linings, on friction lining carrier 20 to form first friction surface 28 and second friction surface 34.

In addition, first type of recesses and/or grooves 40 are generated in first friction surface 28 by a material shaping and/or material casting and/or non-material removing first manufacturing method, preferably by stamping. It has hereby proven advantageous, if the fixing of friction lining 30 to form first friction surface 28 is carried out simultaneously or chronologically overlapping with the generation of first type of recesses and/or grooves 40 in first friction surface 28. Thus, friction lining segments 46 of friction lining 30 might be compressed or pressed on the side of friction lining carrier 20 facing in axial direction 6 with an intermediate layer of adhesive, wherein the stamp or the like used for this purpose might have a corresponding contour which simultaneously generates first type of recesses and/or grooves 40 in corresponding friction lining segment 46, preferably by stamping.

In addition, second type of recesses and/or grooves 42 is generated in second friction surface 34 by a material-removing second manufacturing method, preferably by a mechanical manufacturing method, particularly preferably by milling. In this case, the manufacturing method may also be accelerated, if first type of recesses and/or grooves 40 is generated simultaneously or chronologically overlapping with second type of recesses and/or grooves 42, in that, for example, first type of recesses and/or grooves 40 is generated in friction lining 30 in the previously described way, while the material-removing second manufacturing method for generating second type of recesses and/or grooves 42 in second friction surface 34 formed by friction lining 32 is carried out simultaneously or chronologically overlapping.

In addition, first type of recesses and/or grooves 40 should be generated with a shallower depth than second type of recesses and/or grooves 42, wherein no recesses and/or grooves 42 of the second type should be generated in first friction surface 28—as already previously explained—and/or no recesses and/or grooves 40 of the first type should be generated in second friction surface 34. In order to thereby simplify the manufacturing method even farther, only recesses and/or grooves 40, 44 of the first and third type should be generated in first friction surface 28 and only recesses and/or grooves 42, 44 of the second and third type should be generated in second friction surface 34. As already previously discussed, recesses and/or grooves 44 of the third type are thereby generated in an advantageous way by fixing respective friction lining 30 or 32 on friction lining carrier 20 in a segmented way.

REFERENCE NUMERALS

2 Disk
4 Disk clutch
6 Axial direction
8 Axial direction
10 Radial direction
12 Radial direction
14 Circumferential direction
16 Circumferential direction
18 Axis of rotation
20 Friction lining carrier
22 Outer edge
24 Inner edge
26 Rotary driving contour
28 First friction surface
30 Friction lining
32 Friction lining
34 Second friction surface
36 Outer edge
38 Inner edge
40 First type of recesses and/or grooves
42 Second type of recesses and/or grooves
44 Third type of recesses and/or grooves
46 Friction lining segment
48 First disk carrier
50 First disk support section
52 First rotary driving contour
54 Second disk carrier
56 Second disk support section
58 Second rotary driving contour
60 Disk set
62 First disk set
64 Second disk set
66 Disks

The invention claimed is:

1. A disk (2) for a disk clutch or brake (4) comprising a first friction surface (28) and a second friction surface (34) facing away from the first friction surface (28), in which recesses or grooves (40, 42, 44) are provided, characterized in that a first type of recesses or grooves (40), which is generated by a material shaping or a material casting or a non-material removing first manufacturing method, is provided in the first friction surface (28), and a second type of recesses or grooves (42), which is generated by a material-removing second manufacturing method, is provided in the second friction surface (34), characterized in that the first friction surface (28) has no recesses or grooves (42) of the second type and the second friction surface (34) has no recesses or grooves (40) of the first type, wherein only the first type of recesses or grooves (40) is provided in the first friction surface (28), and only the second type of recesses or grooves (42) is provided in the friction surface (34)

and characterized in that the first type of recesses or grooves (40) has a shallower depth than the second type of recesses or grooves (42).

2. A method for producing a disk (2) according to claim 1, comprising the method steps of:

providing a disk comprising a first friction surface (28) and a second friction surface (34) facing away from the first friction surface (28), generating a first type of recesses or grooves (40) in the first friction surface (28) by a material shaping or a material casting or a non-material removing first manufacturing method, and generating a second type of recesses or grooves (42) in the second friction surface (34) by a material-removing second manufacturing method.

3. The method according to claim 2, wherein generating a second type of recesses or grooves (42) in the second friction surface (34) is performed by a mechanical manufacturing method.

4. The method according to claim 3, wherein the mechanical manufacturing method is milling.

5. The method according to claim 2, in which the disk comprises a friction lining carrier (20) and the fixing of a friction lining (30) on the friction lining carrier (20) forms the first friction surface (28) or the fixing of a friction lining (32) on the friction lining carrier (20) forms the second friction surface (34), wherein the fixing of the friction lining (30) to form the first friction surface (28) is carried out simultaneously with the generation of the first type of recesses or grooves (40) in the first friction surface (28), or the fixing of the friction lining (30; 32) to form the first or second friction surface (28; 34) comprises the fixing of a segmented friction lining (30; 32) and generating an interspersed third type of recesses or grooves (44) which are formed between friction lining segments (46) of respective friction lining (30; 32) and extend substantially from inner edge (38) outward in radial direction (10) to an outer edge (36).

6. The method according to claim 2, in which the first type of recesses or grooves (40) is generated simultaneously with the second type of recesses or grooves (42), or the first type of recesses or grooves (40) is generated with a shallower depth than the second type of recesses or grooves (42), or no recesses or grooves (42) of the second type are provided in the first friction surface (28), or no recesses or grooves (40) of the first type are generated in the second friction surface (34).

7. The method according to claim 2, wherein generating a first type of recesses or grooves (40) in the first friction surface (28) is performed by stamping.

8. The method according to claim 2, wherein only the first type of recesses or grooves (40) is generated in the first friction surface (28), or only the second type of recesses or grooves (42) is generated in the second friction surface (34).

9. The method according to claim 2, wherein the fixing of the friction lining (30) to form the first friction surface (28) is carried out after with the generation of the first type of recesses or grooves (40) in the first friction surface (28).

10. The method according to claim 2, wherein the first type of recesses or grooves (40) is generated after with the second type of recesses or grooves (42).

11. A wet-running disk clutch or brake (4), comprising a first disk set (62), which is connected rotationally fixed to a first disk carrier (48), and comprising a second disk set (64), which is connected rotationally fixed to a second disk carrier (54), wherein the disks (2, 66) of the two disk sets (62, 64) are configured to be brought into frictional engagement with each other via friction surfaces, characterized in that the first or second disk set (62; 64) has at least one disk (2) according to claim 1.

12. The wet-running disk clutch or brake (4) according to claim 11, characterized in that the disks (66) of the second disk set (64) have friction surfaces provided with no recesses or grooves.

13. The wet-running disk clutch or brake (4) according to claim 12, wherein the first friction surfaces (28) of the disks (2) of the first disk set (62) face in a first axial direction (6) of the disk clutch (4) and the second friction surfaces (34) of the disks (2) of the first disk set (62) face in a second axial direction (8), opposite the first axial direction (6), of the disk clutch (4).

14. The disk (2) according to claim 1, characterized in that the first second friction surface (28; 34) of a friction lining (30; 32) fixed on a friction lining carrier (20) is formed as a paper friction lining.

15. The disk (2) according to claim 14, wherein the friction lining (30; 32) is glued on the friction lining carrier (20).

16. The disk (2) according to claim 14, further comprising an interspersed third type of recesses or grooves (44).

17. The disk (2) according to claim 1, characterized in that the first type of recesses or grooves (40) is generated by stamping and the second type of recesses or grooves (42) is generated by a mechanical manufacturing method.

* * * * *